United States Patent [19]

Kage

[11] 4,301,539
[45] Nov. 17, 1981

[54] SUPERVISING SYSTEM FOR USE IN RADIO TRANSMISSION

[75] Inventor: Kouzou Kage, Tokyo, Japan

[73] Assignee: Nippon Electric Co., Ltd., Tokyo, Japan

[21] Appl. No.: 128,787

[22] Filed: Mar. 10, 1980

[30] Foreign Application Priority Data

Mar. 8, 1979 [JP] Japan .................. 54/27053

[51] Int. Cl.³ .................. H04Q 7/00; H04B 7/26
[52] U.S. Cl. .................. 375/107; 375/76; 375/102; 455/89
[58] Field of Search .................. 375/107, 76, 102, 109, 375/111; 179/2 E, 2 EB; 455/88, 89, 54, 55, 56; 370/103, 104

[56] References Cited

U.S. PATENT DOCUMENTS

| | | | |
|---|---|---|---|
| 2,575,782 | 11/1951 | Bartelink | 179/2 EB |
| 3,571,519 | 3/1971 | Tsimbidis | 179/2 EB |
| 3,906,166 | 9/1975 | Cooper | 179/2 EB |
| 4,101,835 | 7/1978 | Taylor | 179/2 EB |
| 4,163,121 | 7/1979 | Yoshikawa | 179/2 EB |

*Primary Examiner*—Benedict V. Safourek
*Assistant Examiner*—Stephen Chin
*Attorney, Agent, or Firm*—Sughrue, Mion, Zinn, Macpeak and Seas

[57] ABSTRACT

A phase shift monitoring system is provided for a mobile communication system which includes a central, or base station, one or more sub-base stations, and a plurality of mobile units. Each sub-base station is provided with a detection means which is operable to transmit an alarm signal to the base station when a predetermined tolerable phase shift is exceeded. The base station includes means for readjusting the transmission timing in order to compensate for the detected phase shift, either automatically or by manual control.

9 Claims, 19 Drawing Figures

SUPERVISING SYSTEM FOR USE IN RADIO TRANSMISSION

The invention relates to a mobile telephone system and, more particularly, to a supervising system for a mobile telephone system for supervising the phase of a signal, e.g., a calling signal transmitted simultaneously from fixed radio stations located at different places to a mobile radio station (For details of a typical example of such a mobile radio telephone system, reference is made to U.S. Pat. No. 4,163,121).

In such a mobile radio telephone system, a central base station supervising a plurality of fixed radio stations (sub-base stations) simultaneously transmits from time to time one single signal, such as calling signal, to the sub-base stations, each of which then transmits the signal in parallel to mobile radio stations through radio waves of a single frequency. In such a situation, the signal must be in phase when transmitted from the sub-base stations. Otherwise, severe interference is caused at the mobile station to which the signal is addressed. In a conventional system, the signal transmitted from the central base station to each sub-base station by way of a wired link is returned from the sub-base station to the central base station through another wired link, for the measurement of the phase difference between the transmitted and returned signals. When the phase difference is beyond a predetermined tolerable limit, a variable delay is given to the signal for the relevant substation to minimize the phase difference.

In such a conventional system, however, the signal return path for the phase difference supervision must be provided separately from the ordinary wired up link from the mobile station through a sub-base station to the base station. This adversely affects the efficiency of the wired communication link. In some cases, the up and down links are switched simultaneously with the delays being changed by the same amounts but in the opposite directions in terms of phase. In such a state, the phase difference measuring device at the central base station can not measure the phase changes in the links. Even if the phase measuring device senses an abnormal phase shift, where the phase abnormality is present cannot be located.

Accordingly, an object of the present invention is to provide a phase supervising system which can supervise the phase of the signals even when the up link from a mobile station through a sub-base station to the central base station is occupied by an ordinary telephone conversation and the like. This is achieved by supervising the phase of the signal on the down link alone.

According to the present invention, there is provided a phase supervising system for supervising the phase of a signal transmitted from a first radio station to a second radio station, said first and second radio stations having transmitting/receiving means, in which the second radio station comprises means for detecting a time change of the data length; and means for transmitting the result of the time change detection of the data length to the first radio station, and the first radio station comprises means for supervising a phase of the data on the basis of the result of the detection transmitted.

The present invention will be described in detail referring to the accompanying drawings, in which.

Figure 1:
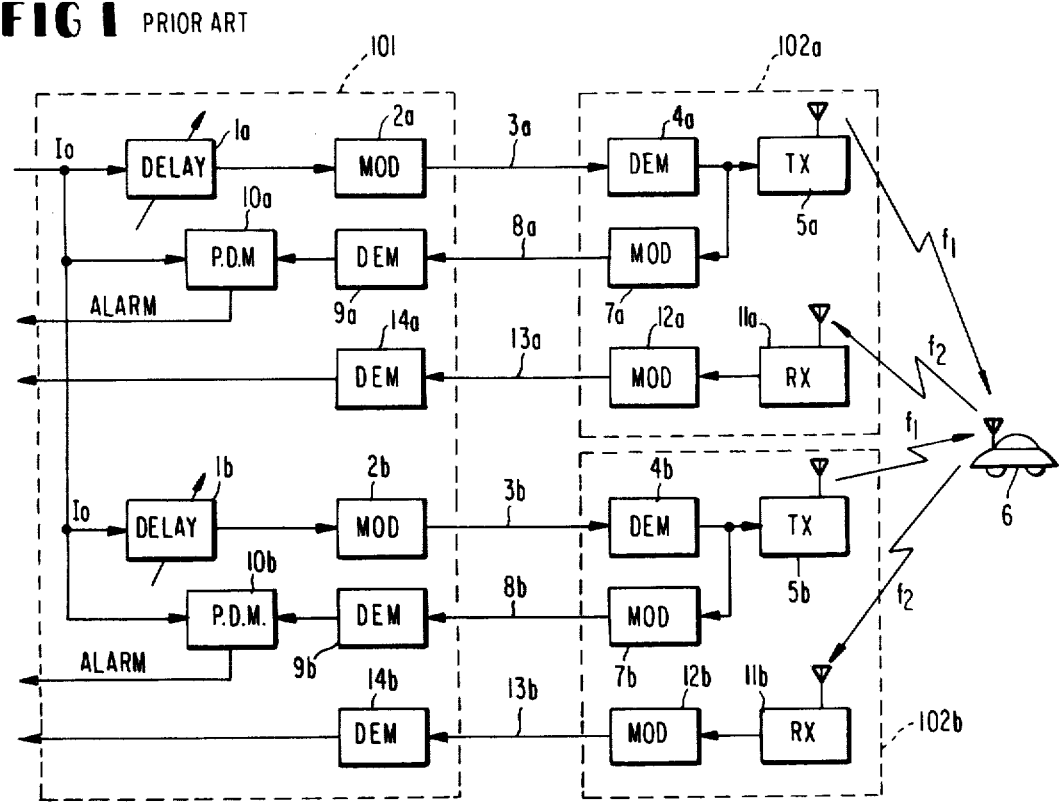
FIG. 1 is a block diagram of a conventional phase supervising system.

Referring to FIG. 1, a signal $I_o$ transmitted from an ordinary telephone network (not shown) is applied to a modulator 2a through a delay circuit 1a of a central station 101. In the modulator 2a, the signal $I_o$ modulates a carrier wave supplied from a carrier wave source (not shown). The modulated carrier is then transmitted via a down link 3a to a demodulator 4a of a sub-base station 102a, where it is demodulated. The demodulation output, i.e., the reproduced signal $I_o$ is then transmitted to a mobile station 6 by a transmitter 5a by a radio wave of frequency $f_1$.

Simultaneously, the signal $I_o$ is transmitted from a sub-base station 102b to the mobile station 6. That is, in the same manner as the sub-base station 102a, the signal $I_o$ is transmitted from the central station 101 through a delay circuit 1b, a modulator 2b and a down link 3b and is demodulated at a demodulator 4b and then forwarded to the mobile station 6 by a transmitter 5b by the radio wave of frequency $f_1$.

On the other hand, a signal emitted from the mobile station 6 is received by a receiver 11a at the sub-base station 102a and by a receiver 11b at the sub-base station 102b at another radio wave of frequency $f_2$. The signal received at receiver 11a is then relayed to the central station 101 via a modulator 12a and an up link 13a. The relayed signal is demodulated by a demodulator 14a, so that the demodulated signal is supplied to the ordinary telephone network. In a similar manner, the signal received at the receiver 11b is relayed to the ordinary telephone network.

Since the signals $I_o$ transmitted from the sub-base stations 102a and 102b are simultaneously transmitted at the single frequency $f_1$, as described above, they should be transmitted in phase to the mobile station 6. Unless the signals $I_o$ transmitted from the stations 102a and 102b are in phase, interference is caused among them. As a result, in an extreme case where they are completely in opposite phase when received at the mobile station, the signal $I_o$ cannot be received.

A typical conventional method to overcome this problem employs means for varying the phase of the signal $I_o$ at the delay circuit 1a or 1b in response to the phase difference detection output from circuit 10a or 10b. The output of the demodulator 4a is also caused to modulate a carrier wave at a modulator 7a and transmitted via an up link 8a to a demodulator 9a of the central base station 101, where it is demodulated. The phase difference detecting circuit 10a compares the signal $I_o$ from the ordinary telephone network with the demodulation signal from the demodulator 9a. When the phase difference between these signals is beyond a predetermined tolerable limit, it emits the alarm signal. In a similar manner, the phase difference detecting circuit 10b emits the alarm signal, i.e., the phase difference detection output.

In the conventional system shown in FIG. 1, the return link 8a or 8b for the phase difference supervision must be provided separately from the ordinary up link 13a or 13b. This decreases the efficiency of the communication link. Further, the system cannot detect phase changes when the return link 8a or 8b and the down link 3a or 3b have phase changes in the opposite directions. Still further, it cannot locate where the phase changes are caused.

Figure 2A:
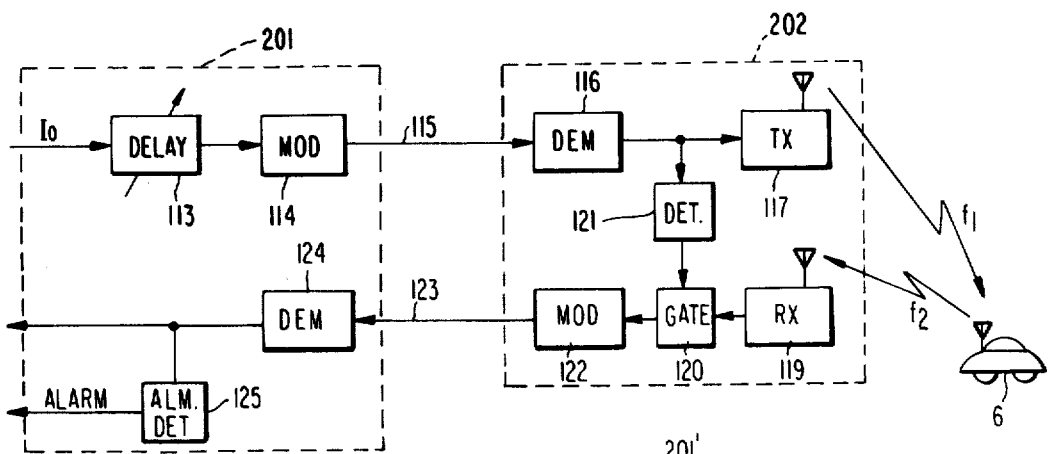
FIGS. 2A and 2B are block diagrams illustrating a phase supervising system according to the present invention.

Turning now to FIG. 2A, there is shown an embodiment of a phase supervising system according to the present invention. In the figure, reference numeral 201 designates a central base station and numeral 202 is a sub-base station. Although the actual system has a plurality of the sub-base stations, the embodiment employs only one sub-base station for the purpose of simplification of explanation.

Signal $I_o$ from the ordinary telephone network passes through a delay circuit 113 to enter a modulator 114. In the modulator 114, the signal $I_o$ modulates a carrier wave supplied from a carrier wave source (not shown). The modulated carrier passes through a down link 115 and enters a demodulator 116, where it is demodulated. The demodulated signal is then transmitted from a transmitter 117 with a radio wave of a frequency $f_1$ to a mobile station 6. The signal radiated from the mobile station reaches, through a radio wave of a frequency $f_2$, a receiver 119 of the sub-base station 202. The received signal is supplied through a gate circuit 120 to a modulator 122, where it modulates a carrier wave. The modulated carrier wave passes through an up link 123 to be applied to a demodulator 124, where it is demodulated. The demodulation output is then forwarded to the ordinary telephone network.

A detector circuit 121 detects the phase change of the demodulated signal from the demodulator 116. When the phase change detected by the detector circuit 121 exceeds a predetermined tolerable limit, the circuit 121 transmits an alarm signal through a gate circuit 120, a modulator 122 and an up link 123 to the central base station 201. An alarm detection circuit 125 in the central base station detects the alarm signal, so that the undesired phase change is compensated for by manually changing the amount of the delay of the delay circuit 113.

The control of the delay circuit 113 in the central base station 201 is performed manually in the embodiment in FIG. 2A. It may be made automatically in the embodiment illustrated in FIG. 2B. In the FIG. 2B, a control circuit 126 in a central base station 201, in response to an output signal from the alarm detection circuit 125, automatically adjusts the delay at a delay circuit 113' within the tolerable limit. The delay circuits 113 and 113' may be placed on the output side of the demodulator 116 of the sub-base station. A detailed construction for adjusting the delay amount shown in FIGS. 2A and 2B will be explained subsequently.

The gate circuit 120, the detection circuit 121 and the alarm detection circuit 125 will be described in detail hereunder.

Figure 3:
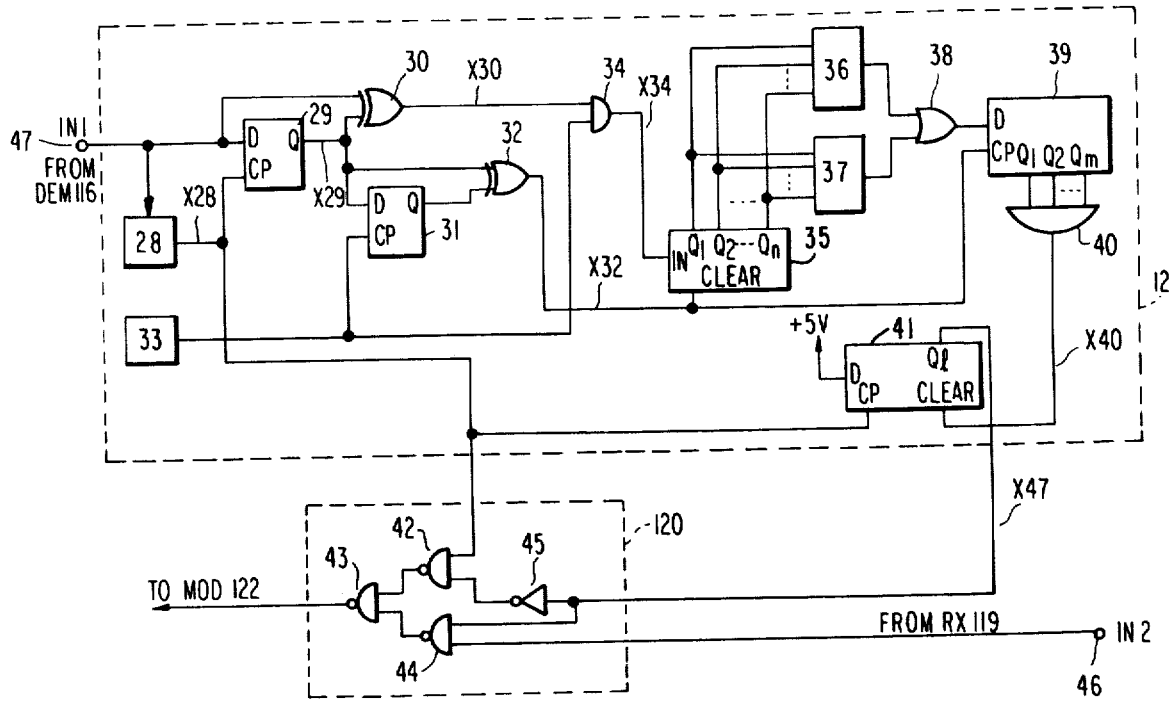
FIG. 3 is a circuit diagram of a gate circuit and a phase change detection circuit used in the system shown in FIGS. 2A and 2B.

FIG. 3 shows a first embodiment of the gate circuit 120 and the detection circuit 121. The detection circuit 121 is adapted to detect whether there is a change in the delay in the output signal from the demodulator 116 on the basis of the reproduced clock pulse. A set of timing charts for representing the operation of the detection circuit 121 are illustrated in FIGS. 4A to 4F.

In the sub-base station 202, the demodulator 116 supplies the demodulated signal in1 to an input terminal 47 of the detection circuit 121. The circuit 121 has a clock pulse reproduction circuit 28 which provides a clock pulse X28 at its output terminal. The timing charts shown in FIGS. 4A to 4F are for the signal in1 delayed by time To due to, for example, the link switching. The clock pulse reproduction circuit 28 is given a very low phase-shift response so that the reproduced clock pulse stays stabilized in phase even if there is an appreciable phase shift in the incoming pulse. The timing charts shown in FIGS. 4A to 4F illustrate a situation where the signal in1 synchronized with the clock pulse of a repetition period $T_1$, is driven out of synchronism and is being followed by a clock pulse of a repetition period $T_2$ for attaining the phase synchronization.

Figure 4:
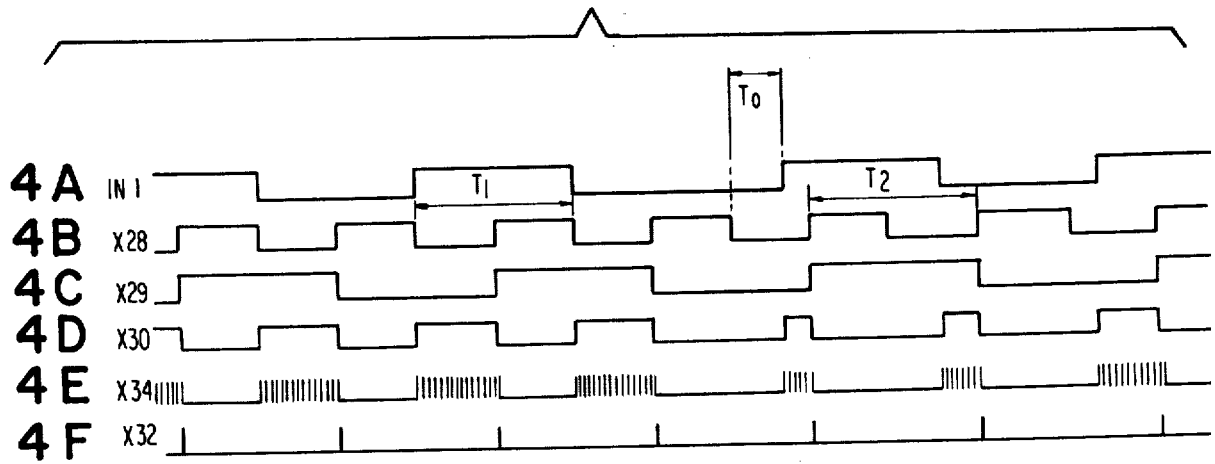
FIGS. 4A to 4F are time charts useful in explaining the operation of the circuit in FIG. 3.

Referring to FIG. 3, a flip-flop 29 extracts data pulse train at the leading edge of the clock pulse from the signal in1. The signal in1 and the output X29 supplied from the flip-flop 29 are applied to an exclusive OR circuit 30 to provide a train of pulses X30 of a pulse width proportional to the time duration from the transition of the signal in1 to the leading edge of the clock pulse X28, as shown in FIG. 4D. An oscillation circuit 33 provides a train of high speed pulses, which is applied together with the pulse train X30 to an AND circuit 34 whose output X34 is then applied to a counter 35. The combination of the flip-flop 31 and an exclusive OR circuit 32 produces a sampling pulse X32 at the transition point of the pulse X29. The counter 35 starts counting the number of pulses upon application of the input signal in1 and the leading edge of the clock pulse X28 until it is cleared by the pulse X32.

Circuits 36 and 37 are digital comparators for comparing the numerical data at the counter 35 with given values N1 and N2, respectively. When the given values N1 and N2 are set to satisfy N1 < N2, the contents at the counter 35 smaller than N1 signifies that the output of the circuit 36 is at a high level. Conversely, if the contents of the counter 35 is larger than N2, the output of the circuit 37 is at a high level. In other words, if the phase difference between the signal in1 and the leading edge of the reproduced clock pulse X28 does not fall within a predetermined value, either the circuit 36 or 37 exhibits a high level. The circuit denoted by 38 is an OR circuit which produces an output at high level when at least one of the outputs of the circuits 36 and 37 is at a high level. The circuit 39 is a shift register for storing the output signal of the OR circuit 38 in response to the sampling pulse X32. The result of the sampling and storing is applied to an AND circuit 40.

When the output of the OR circuit 38 stays continuously at a high level for m times, the output signal X40 is at high level. Such state is not held to be caused by jitter or noise contained in the signal in1 but by the change in the delay suffered by the signal in1. Reference numeral 41 denotes a shift register adapted to be cleared when the pulse X40 is in high level, so that it may stay at a low level for 1 repetition period of the clock pulse X28 and return to a high level. In summary, when the signal in1 is driven out of synchronism with the clock pulse X28 beyond a predetermined tolerable limit to stay in that state for m transitions of the signal in1, all the outputs from the register 39 are at a high level, with the shift register 41 cleared, and with the output X47 kept at a low level during 1 repetition period. Thus, the change in the signal length resulting from the link switching is detected.

Figure 2B:
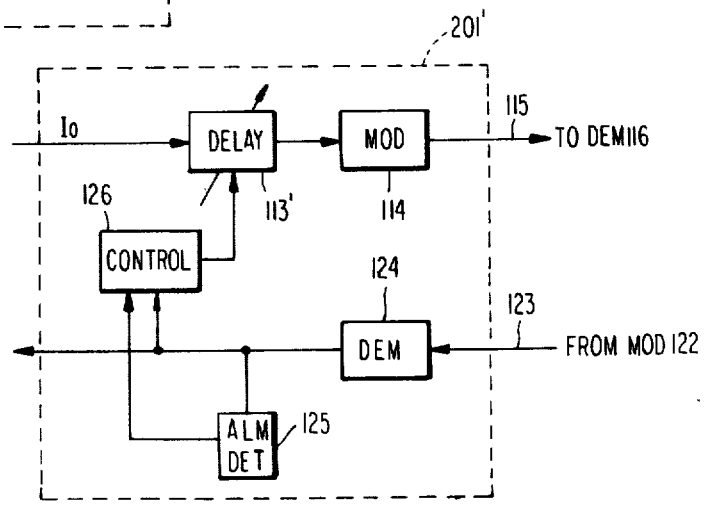

When the change in the signal length in the down-link signal is detected at the detection circuit 121, the gate circuit 120 inserts 1-bit alarm signal to the up-link signal to report the signal-length change to the central base station. The example shown in FIG. 3 transmits the clock pulse X28 as the alarm signal. In FIGS. 2A and 2B, the alarm signal detection circuit 125 of the central base station may be realized easily by a narrow band pass filter allowing only the clock pulse X28 to pass therethrough or by a pattern coincidence circuit detecting a bit pattern such as 101010 . . . .

In the embodiment shown in FIG. 3 of the gate circuit 120 and detection circuit 121, the up link is used for 1 bit only at the path switching time, so that the up link normally allows data from the mobile station to pass from the sub-base station to the central base station. Further, the supervision of the phase is performed only on the down link, so that the alarm indicates that the down link is switched.

Figure 5:
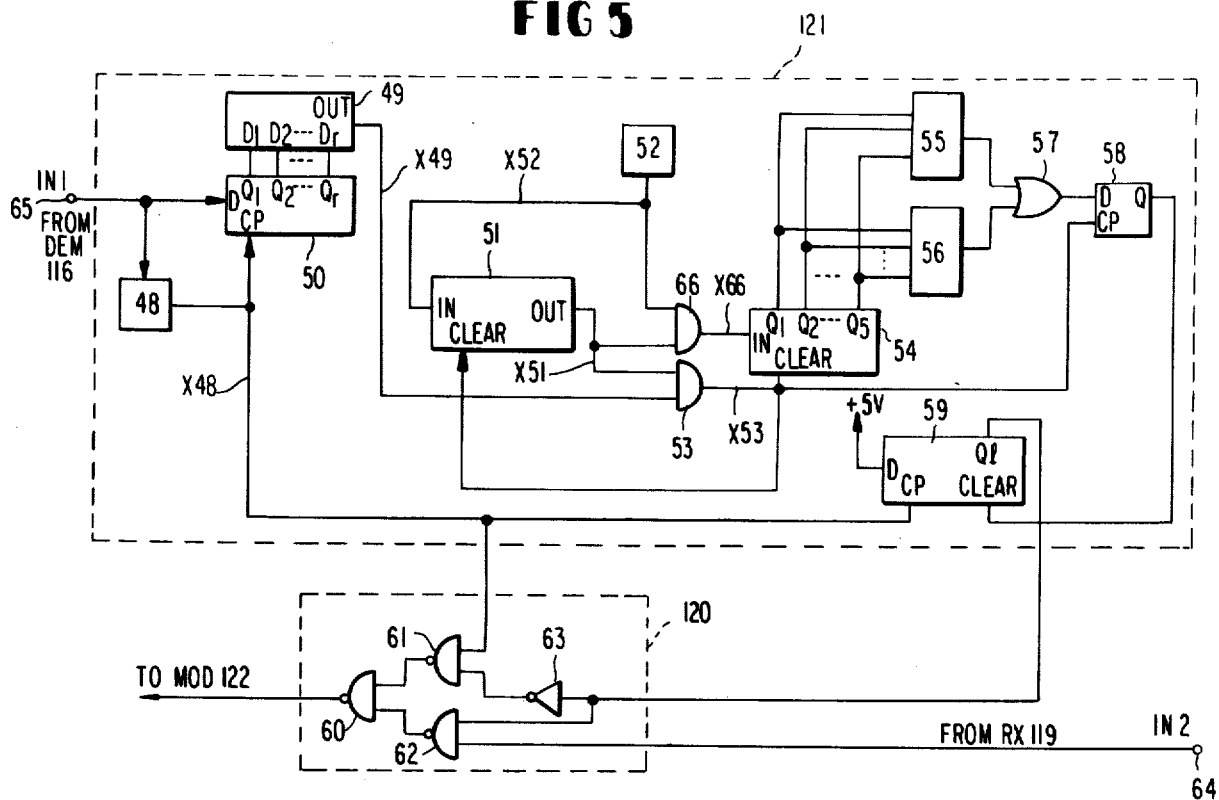
FIG. 5 is a circuit diagram of another example of the gate circuit and the phase change detection circuit shown in FIGS. 2A and 2B.

FIG. 5 shows a second embodiment of the gate circuit 120 and the detection circuit 121. The gate circuit 120 is identical in circuit construction to the embodiment shown in FIG. 3. The detection circuit 121 measures the time variation of repetition periods of a specific pattern included in the signal from the demodulator 116 to determine whether the shift in the signal phase is larger or smaller than a given value. FIGS. 6A to 6E are time charts for illustrating the operation of the second embodiment.

The output from the demodulator 116 is applied as the input signal in1 to an input terminal 65 of the detection circuit 121. Responsive to the signal in1, the clock reproduction circuit 48 reproduces a clock pulse X48. Then, the reproduced clock pulse X48 drives a shift register 50 to which the input signal in1 is also applied. When outputs $Q_1$ to $Q_r$ from the shift register 50 form a given PN pattern, coincidence circuit 49 responds to it to produce a pulse X49, as shown in FIG. 6B.

The output X51 of a counter 51 rises when the counter 51 counts the output X52 from a high speed pulse generator circuit 52 for a duration of $T_4$. The counter 51 is cleared by a signal X53 supplied from an AND gate 53 when the signals X51 and X49 are applied to the AND gate 53 from the counter 51 and the pattern coincidence circuit 49, respectively. Thus, the AND circuit 51 prevents the counter 53 from being reset by a signal obtained when the same pattern as the pattern PN is extracted from the other data, so that the counter 51 may respond only to the phase supervising signal included in the signal in1.

Figure 6:
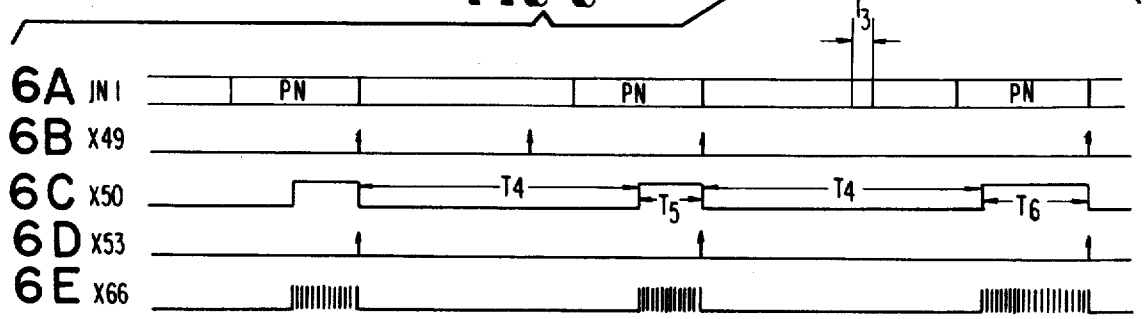
FIGS. 6A to 6E are time charts for explaining the operation of the circuit in FIG. 5.

The pulse X51 has a given pulse width $T_5$ when the PN pattern is received at a given interval, as shown in FIG. 6C. Accordingly, when the signal pattern PN is delayed by $T_3$, for example, by the link switching, the pulse width of the pulse X51 is: $T_6 = T_5 + T_3$. Therefore, by supervising the pulse width of the pulse X51, it is possible to detect the delay caused in the down link.

The output of the pulse generating circuit 52 and the pulse X51 are applied to an AND circuit 66 to form a train of pulses X66 whose number is proportional to the pulse width of the pulse X51, as shown in FIG. 6E. The pulse train X66 is applied to a counter 54. Numerals 55 and 56 are comparators adapted to produce a high level output signal when the contents of the counter 54 is not within a given region in exactly the same manner as that for the comparators 36 and 37 shown in FIG. 3. The sampling of the output of the comparators 55 and 54 by a flip-flop 58 through an OR circuit 57 is equivalent to the supervising of the width of the pulse X51. When a link is switched and the output of the flip-flop 58 becomes high level, the output of the shift register 59 is in a low level for 1 bit period and the clock pulse X48 is transmitted to the central base station as alarm signal for the down link switching.

In the embodiment shown in FIG. 3, the phase is supervised by the transition in the signal. When the change in delay time due to the switching of the link is equal to one bit period, it is impossible to detect the circuit switching.

In contrast, the embodiment shown in FIG. 5 supervises the phase by using the bit pattern, so that, even when the change in the delay time due to the link switching exceeds one bit period, link switching can be detected. Thus, the circuit construction shown in FIG. 3 is suitable for such a case where the down link data has no specific bit pattern for the phase supervising and the delay change due to the link switching is within the one bit period. The embodiment shown in FIG. 5 is suitable for the case where the delay change due to the link switching exceeds one bit period and the down link data has a specific bit pattern for the phase supervising.

A detailed construction for effecting the delay adjustment shown in FIGS. 2A and 2B will now be described referring to FIG. 7.

Figure 7:
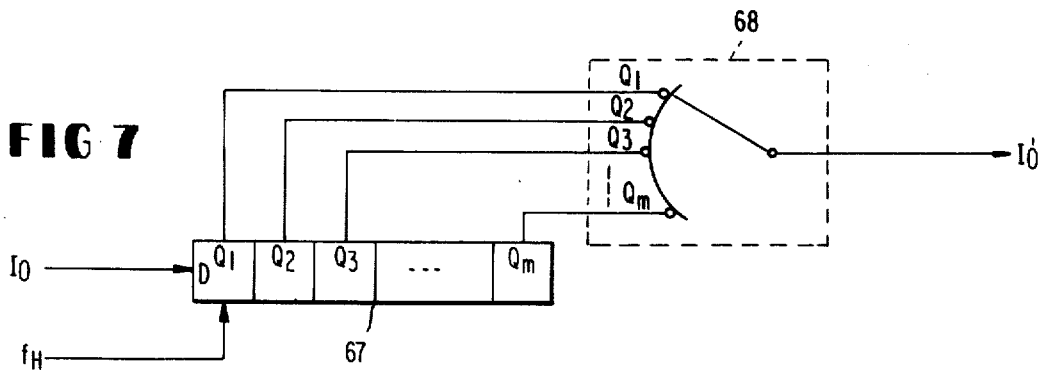
FIG. 7 is a block diagram of a delay circuit for the circuit of FIG. 2A whose delay is changed manually.

FIG. 7 shows a construction for manually setting the delay circuit 113 shown in FIG. 2A. The signal $I_o$ transmitted to the sub-base station is applied to the shift register 67 operating in response to the high speed clock pulse $f_H$. A delayed output $I_o'$ is obtained by properly selecting one of the output signals $Q_1, Q_2, \ldots, Q_m$ by means of a rotary switch 68.

Figure 8:
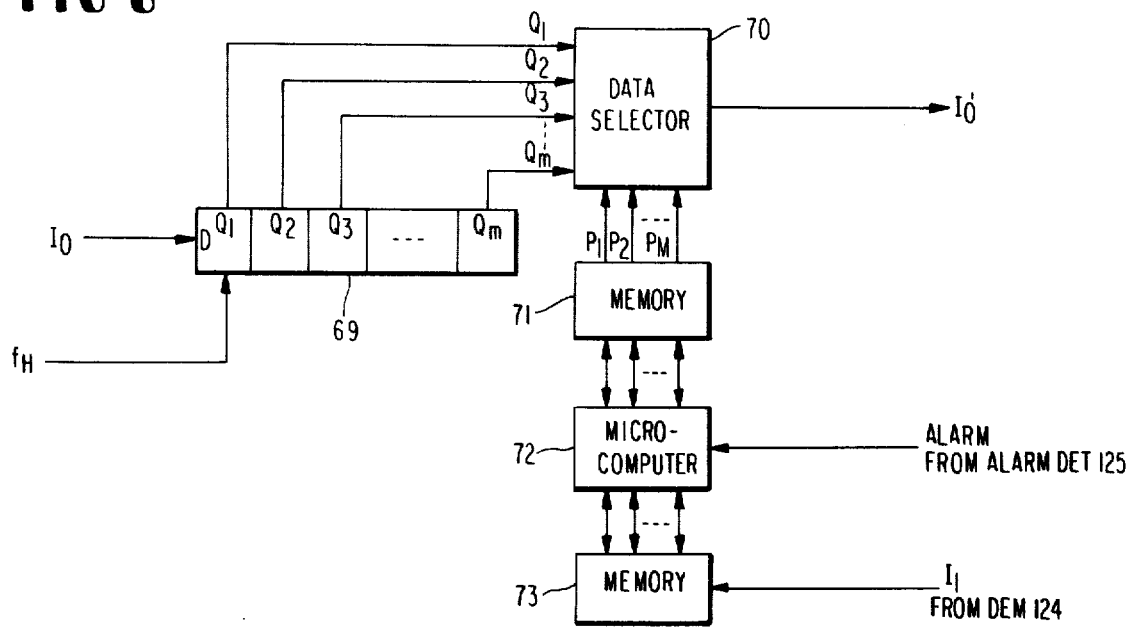
FIG. 8 is a block diagram showing a delay circuit and its control circuit for automatically controlling the delay as shown in FIG. 2B.

The construction shown in FIG. 8 is for automatically setting the delay time of the delay circuit 113' shown in FIG. 2B. To automatically set the delay time, it is necessary to transmit the delay data from the sub-base station to the central base station. Signal $I_1$ from the demodulator 124 is the very delay data. In the drawing, reference numeral 69 designates a shift register responsive to the high speed clock $f_H$; 71 and 73, memories; 70, a data selector; 72, a microcomputer for automatic control.

It is assumed here that the detection of the change in the delay time of the signal from the central base station results in the transmission of the amount of the change and the alarm signal. The central base station then detects the alarm data at the alarm data detection circuit 125 (FIG. 2B) and transmits it to the microcomputer 72. The signal $I_1$ representing the change of delay time is applied from the demodulator 124 to the memory 73 where it is stored. The microcomputer 72 responds to the alarm signal to add the contents of the memories 73 and 71 or subtract one from the other. As a result, the contents of the memory 71 are rewritten. In response to the outputs $P_1, P_2, \ldots P_M$, the data selector 70 selects one of the outputs $Q_1, Q_2, \ldots Q_m$ thereby to produce a delay output $I_o'$. The output $I_o$ includes the minimum delay time with respect to the input signal $I_o$ when the output $Q_1$ is selected from the shift register $Q_1$. The output $I_o'$ includes the maximum delay time when the output $Q_m$ is selected.

It will be seen from the FIG. 8 that, to automatically set the delay time, the alarm signal and the data representing the amount of change in the delay time are necessary. Circuit arrangements for providing these data will be now described.

Figure 9:
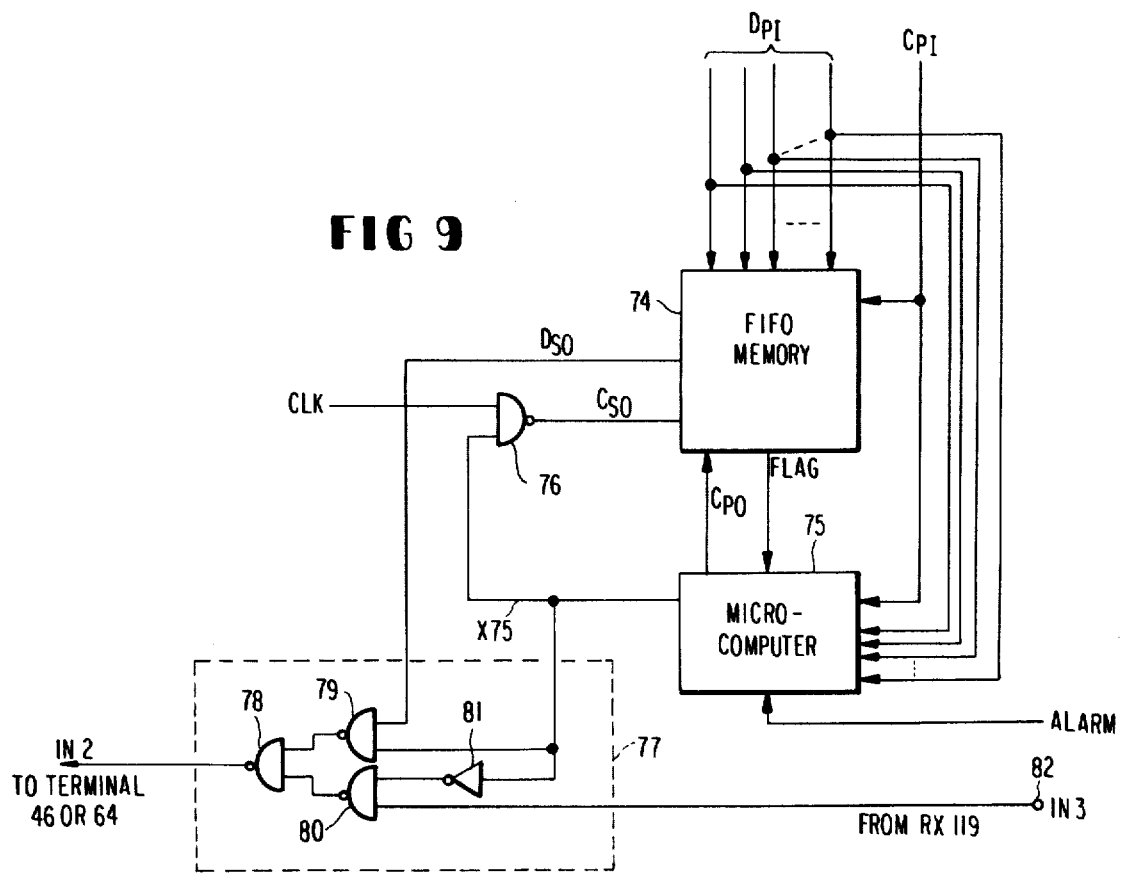
FIG. 9 is a block diagram of a detection circuit for detecting the delay variation at a sub-base station, which is used when the delay is automatically changed as shown in FIG. 2B and FIG. 8.

Referring to FIG. 9, reference numeral 74 designates a first-in/first-out (FIFO) memory put on the market as model µPD3812D by Nippon Electric Co., Ltd., which allows parallel input and serial output. The microcomputer 75 supervises the state of the FIFO memory 74 by using a flag signal (FLAG) and discards the unnecessary data by producing a parallel output clock $C_{PO}$. The parallel input data to the FIFO memory 74 includes the data representing the change in delay caused in the link between the central base station and the sub-base station. The data correspond to the outputs $Q_1, Q_2, \ldots Q_n$ from the counter 3 (FIG. 3) or to the outputs $Q_1, Q_2, \ldots Q_s$ of the counter 54 (FIG. 5). A clock $C_{PI}$ used for writing data into the FIFO memory 74 corresponds to the signal X32 (FIG. 3) or to the signal X53 (FIG. 5). A clock signal CLK is for serially transferring data from the FIFO memory 74 as serial output data $D_{so}$ when the gate 76 is enabled. The clock signal CLK corresponds to the signal X28 (FIG. 3) or to the signal X48 (FIG. 5).

An alarm signal ALM indicates that the change in the delay in the down link extending from the central base station is now being transferred to the central base station, as in the case of the signal X47 in FIG. 3 or the signal $Q_1$ in FIG. 5. A switch circuit 77 is used to transfer the serial output data $D_{so}$ representing the change in the delay from the central base station to the sub-base station during the period when the output X75 from the microcomputer 75 is in the rising state. The input in3 to the terminal 82 is from the receiver 119 shown in FIG. 2A. The output from the switch circuit 77 is coupled with the terminal 64 (FIG. 5) or the terminal 46 (FIG. 3) and is supplied to the gate circuit 120.

To the FIFO memory 74 is loaded with the parallel data $D_{PI}$ representing the change in the delay time of the down link. The microcomputer 75 supervises the state of the FIFO memory 74 in response to the parallel clock $C_{PI}$ and the flag signal FLAG to discard unessential data. When the change in the delay of the down link is detected or, when the data representing the change in the delay is transferred from the switch circuit 120 to the central base station, the alarm signal ALM rises, causing the microcomputer 75 to produce the output signal X75, with a result that the data stored in the FIFO memory 74 is transferred from the switch circuit 77 to the central base station, as the serial data $D_{so}$, until the alarm signal ALM falls. Thus, the signals representative of the delay-time-change and the amount of the change are transferred from the sub-base station to the central base station. With the microcomputer checking if the amount of the delay is ideally reset or not, the reliability of the operation is ensured.

As described above, the phase supervising system according to the present invention makes it possible to supervise the phase of the down link only, with result that the phase supervision can be performed while the up link data from the mobile station is transmitted to the central base station, so long as the link switching is not made.

What is claimed is:

1. A phase shift monitoring system for a mobile communication system having a central station, one or more base stations coupled with said central station through a wired communication link, and a plurality of mobile radio stations linked with said base stations through radio communication links; said base stations, responsive to a command signal supplied from said central station, transmitting from time to time a specific signal common to said mobile radio stations through carrier waves of a common frequency, together with ordinary information signals for communication between said mobile radio stations and said central station, said specific signal having a predetermined repetition rate, characterized in that each of said base stations comprises: means for detecting said specific signal; means for providing a time reference pulse in timed relationship with said information signals; means responsive to said time reference pulse and said specific signal for determining whether the fluctuation in the timing of said specific signal is within a preset tolerable limit; means responsive to said determining means for generating an alarm signal when said preset tolerable limit is exceeded; and means for transmitting said alarm signal to said central station, and means for readjusting the transmission timing of said command signal to compensate for said fluctuation; whereby the specific signals are rendered in phase when transmitted at said base stations through said radio communication so that the interference caused at said mobile radio stations may be minimized.

2. A phase shift monitoring system as claimed in claim 1, wherein said determining means includes a pair of digital comparators operable to produce an output signal if the phase difference between said specific signal and said time reference pulse exceeds a predetermined value, one of said comparators providing an output signal in response to a positive phase difference, and the other of said comparators providing an output signal in response to a negative phase difference.

3. A phase shift monitoring system as defined in claim 2, wherein the outputs of said pair of digital comparators are applied to an OR circuit, said OR circuit producing an output upon either of said comparators producing an output.

4. A phase shift monitoring system as defined in claim 3, wherein the output of said OR circuit is applied to said alarm signal generating means, said alarm signal generating means being operable to produce an output upon receiving a predetermined number of sequential outputs from said OR circuit.

5. A phase shift monitoring system as defined in claim 1, wherein said means for transmitting said alarm signal to said central station comprises gate circuit means operable to insert a 1-bit time reference pulse into the ordinary information signals for communication between said mobile stations and said central station.

6. A phase shift monitoring system as defined in claim 1, wherein said means for readjusting the transmission timing of said command signal comprises manually operated means including a rotary switch, the leads of which are connected to the outputs of a shift register.

7. A phase shift monitoring system as defined in claim 1, wherein said means for readjusting the transmission timing of said command signal comprises a delay circuit at said central station which is adjustable in response to a control means.

8. A phase shift monitoring system as defined in claim 7, wherein said control means comprises means for detecting the amount of the change in the delay time, first memory means for storing said change in delay time, second memory means for storing the previous delay time. microcomputer means for detecting said alarm signal and for adding or subtracting the contents of said first memory means to the contents of said second memory means, whereby the memory of said second memory means is rewritten to contain a new delay time, said delay circuit means being responsive to said second memory means for producing a delayed output, thereby readjusting the transmission timing of said command signal.

9. A phase shift monitoring system as claimed in claim 1, further comprising means for determining the amount of change in the delay time including FIFO memory means receiving as data parallel inputs representing the change in delay caused in the link between the central station and the base station, and microcomputer means responsive to said alarm signal to cause the data stored in said FIFO memory means to be serially transferred through switch circuit means to said central station during the duration of said alarm signal.

* * * * *